May 12, 1925.

E. J. FRENCH 1,537,341

AUXILIARY SWITCH FOR THE LIGHTING SYSTEMS OF AUTOMOBILES

Filed Oct. 26, 1921

Earl J. French, Inventor

By Shepherd Campbell

Attorneys

Patented May 12, 1925.

1,537,341

UNITED STATES PATENT OFFICE.

EARL J. FRENCH, OF ESCANABA, MICHIGAN.

AUXILIARY SWITCH FOR THE LIGHTING SYSTEMS OF AUTOMOBILES.

Application filed October 26, 1921. Serial No. 510,486.

*To all whom it may concern:*

Be it known that EARL J. FRENCH, a citizen of the United States, residing at Escanaba, in the county of Delta and State of Michigan, has invented certain new and useful Improvements in Auxiliary Switches for the Lighting Systems of Automobiles, of which the following is a specification, reference being had therein to the accompanying drawings.

This invention relates to an auxiliary switch for the lighting systems of automobiles and it has for its object to provide a switch adapted to be connected to and supported upon the steering wheel so that the lights may be turned on or off or dimmed or brightened without requiring the driver to release his grip upon the steering wheel.

It is a well known fact that many accidents have been caused by the driver of an automobile releasing his grip upon the steering wheel for the purpose of dimming his lights when passing another machine. The lights are usually dimmed only when passing another machine and consequently it is at this time above all others that the driver should keep a firm grasp upon the steering wheel. It is, therefore, a primary purpose of the present invention to bring together in a small and compact article all of the necessary elements for controlling the intensity of the lights and also for controlling the main current supply and to mount this upon one of the spokes of the steering wheel with the controlling buttons for dimming or brightening the lights in such position that they may be pressed by the thumb without removing the hand from the steering wheel.

Further objects and advantages of the invention will be set forth in the detailed description which follows.

In the accompanying drawing.

Like numerals designate corresponding parts throughout the several figures of the drawing.

Figure 1:
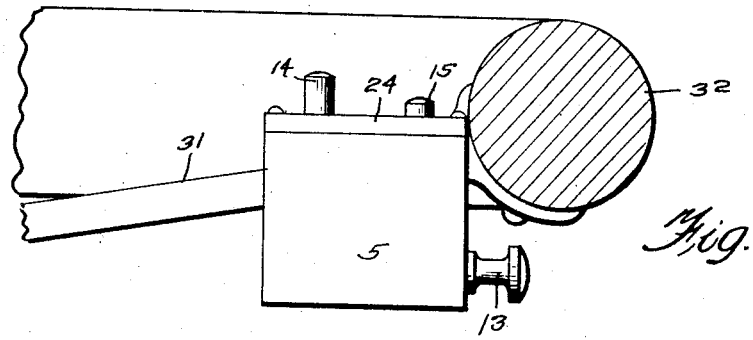
Fig. 1 is a side elevation of the switch showing the same applied to a steering wheel.
Figures 2, 3:
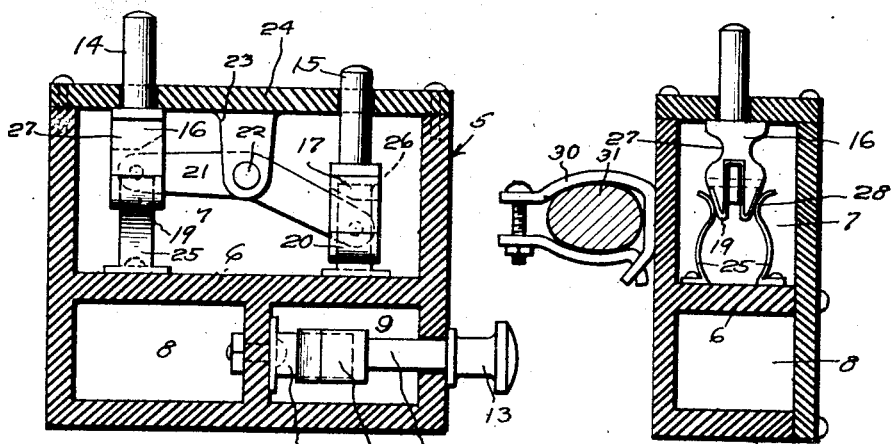
Fig. 2 is a transverse vertical section of the switch.
Fig. 3 is a longitudinal vertical section through the switch.

In the drawing 5 designates a casing which may be of any suitable material but is preferably of bakelite or like insulating material. This casing is divided by a transversely extending horizontal wall 6 into an upper compartment 7 and a lower compartment 8. The several switches constituting the complete switch of the present invention are alike in construction. The main line switch 9 is located in the lower compartment 8 and comprises spaced spring contacts 10 between which a plunger 11 moves, said plunger being carried by a stem 12 and operable by a button 13 disposed upon the exterior of the case. The manner of the completion of the circuit through this switch will be presently set forth.

There are two switches in the upper compartment 7 and when the circuit is completed through one of these, the lights are dimmed and when the circuit is completed through the other the lights are brightened, as presently set forth. The plungers 14 and 15 of these switches comprise upper portions 16 and 17 of insulating material, such as bakelite, and lower conductive portions 19 and 20 of brass or other suitable conducting material. An interlock bar 21 is pivoted at 22 to a hanger 23 which is carried by the cap plate 24 so that all of these parts may be brought into operative relation to the spaced contact spring strips 25 and 26 by the mere act of placing the cap plate in position. The interlock bar 21 has its outer end pivotally connected to the metallic conducting portions 19 and 20 of the plungers. The upper nonconductive portions of the plungers have reduced portions 27 into which the bowed ends 28 of the spring strips 25 and 26 are adapted to snap when the plungers are forced downwardly. It is manifest that if the plunger 14 be forced downwardly the plunger 15 will be forced upwardly and vice versa and that these plungers will be held in the position to which they are moved by the engagement of the bowed ends 28 of the spring strips with the reduced portions 27 of the plungers. It is further manifest that the circuit is completed through any of the pairs of spring strips when the corresponding plunger is moved outwardly to dispose the metallic conducting portions between the ends of the said strips. When the plungers are pressed inwardly the bowed ends of the corresponding spring strips rest upon the nonconductive bakelite and the remaining metallic conductive portion of the material of that particular plunger is out of contact with the corresponding spring strips.

Figure 4:
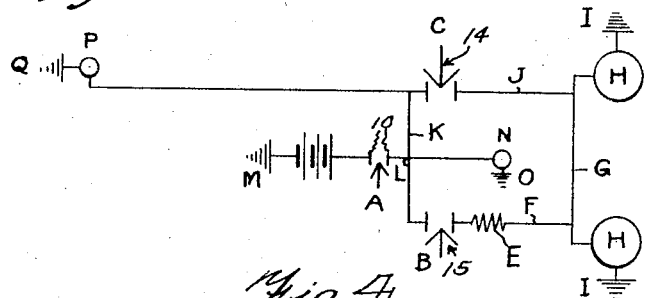
Fig. 4 is a diagrammatic view illustrating the manner of wiring in a system employing a switch of the present construction.

In Fig. 4 I have diagrammatically illustrated one system of wiring such as may be employed in conjunction with the switch of the present construction. In this view the main line switch which is contained in the lower compartment 8 is indicated at A. The dimmer switch is indicated at B and the bright light switch is indicated at C. A dimmer coil E is disposed in a conductor F which leads from one side of the switch B and is connected to a conductor G which is common to both of the head-lights H. The other sides of these head-lights are grounded, as indicated at I. The conductor G is connected by a conductor J to one side of the switch C, the other side of said switch being connected to a conductor K which is in connection with the battery through a conductor L in which the switch A is included. The other side of the battery is grounded at M. One side of a dash light N is connected to the conductor K and the other side of said dash light is grounded at O. A tail light P is grounded upon one side, as indicated at Q its opposite side being connected to the conductor K or to one of the terminals of the switch C. It is manifest that under this arrangement the dash and tail lights are not controlled by the dimmer coil but burn all the time that the main line switch A is closed. If the switch B is closed the current to the lamp must pass through the dimmer coil E, while if the switch C is closed the current passes from the battery L through switch A, conductor K, switch C, conductor J and conductor G to each of the head-lights H. Since the other side of the battery is grounded and since the other sides of the lamps are grounded, it is manifest that the lights will burn brightly at this time.

It will be observed that the plungers which dim and brighten the lights are disposed at the top of the casing but that the main line controlling switch has its controlling button located in such position that the operator must reach beneath the rim of the steering wheel and impart a pull to said button. There is, consequently, no possibility of the driver confusing the main line button or plunger with the others and thereby putting the lights out entirely instead of merely dimming them. It will further be noted that only one of the plungers 14 and 15 is elevated at a time. Consequently the driver cannot push the wrong button even in the dark. A clamp 30 serves to clamp the casing upon one of the spokes 31 of the steering wheel 32 in such position that the plungers 14 and 15 may be reached by the thumb without removing the hand from the steering wheel.

It is to be understood that the invention is not limited to the precise construction set forth but that it includes within its purview whatever changes fairly come within either the terms or the spirit of the appended claim.

Having described my invention, what I claim is:

A device of the character described comprising a casing, a horizontally disposed switch located in the lower part thereof and constituting a main line switch, said main line switch comprising an operating plunger projecting horizontally through a wall of the casing, a pair of switches disposed in the upper part of the casing, a pivoted interlocking bar between said switches to cause them to move together, said switches comprising vertically disposed plungers projecting through the top of the casing and a clamp carried by the casing and adapted to clamp said casing upon one of the spokes of a steering wheel and in such position as to cause the vertically disposed plungers to lie within the plane of the wheel between the rim and the center of the wheel and to cause the horizontally disposed plunger of the main line switch to lie below the plane of the rim of said steering wheel.

In testimony whereof I hereunto affix my signature.

EARL J. FRENCH.